US012780445B2

(12) United States Patent
Perez Rocha et al.

(10) Patent No.: US 12,780,445 B2
(45) Date of Patent: Nov. 3, 2026

(54) AUTOLAND ANYWHERE SYSTEM

(71) Applicant: Rockwell Collins, Inc., Cedar Rapids, IA (US)

(72) Inventors: Andres Perez Rocha, Cumming, GA (US); John Roltgen, Cedar Rapids, IA (US); Juan Segal, Cedar Rapids, IA (US); Thomas Scanlon, Cedar Rapids, IA (US); Agrim Sareen, Lynnwood, WA (US); John Perich, Duluth, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 106 days.

(21) Appl. No.: 18/617,358

(22) Filed: Mar. 26, 2024

(65) Prior Publication Data

US 2025/0304278 A1 Oct. 2, 2025

(51) Int. Cl.

*G05D 1/243* (2024.01)
*B64D 45/04* (2006.01)
*G05D 1/248* (2024.01)
*G05D 1/654* (2024.01)
*G05D 109/20* (2024.01)
*G05D 111/10* (2024.01)
*G05D 111/67* (2024.01)

(52) U.S. Cl.

CPC ............. *B64D 45/04* (2013.01); *G05D 1/243* (2024.01); *G05D 1/248* (2024.01); *G05D 1/654* (2024.01); *G05D 2109/20* (2024.01); *G05D 2111/10* (2024.01); *G05D 2111/67* (2024.01)

(58) Field of Classification Search

CPC ........ B64D 45/04; G05D 1/243; G05D 1/248; G05D 1/654; G05D 2109/20; G05D 2111/10; G05D 2111/67; G05D 1/0676; G08G 5/54; G08G 5/20; G01S 19/15

See application file for complete search history.

(56) References Cited

U.S. PATENT DOCUMENTS

| | | | |
|---|---|---|---|
| 9,939,818 | B2 | 4/2018 | Boada-Bauxell et al. |
| 10,677,916 | B2 | 6/2020 | Laplace et al. |
| 10,793,286 | B1 | 10/2020 | Carrico et al. |
| 10,816,970 | B2 | 10/2020 | Bosworth et al. |
| 11,004,348 | B1 | 5/2021 | Lahr et al. |
| 11,055,875 | B2 | 7/2021 | Cramblitt |

(Continued)

*Primary Examiner* — Bao Long T Nguyen
(74) *Attorney, Agent, or Firm* — Kinney & Lange, P.A.

(57) ABSTRACT

A system for determining an automatic landing path for an aircraft that can conduct automatic landings in many different scenarios. The system includes an aircraft landing controller, a network of sensing systems comprising a Global Navigation Satellite System (GNSS), an Instrument Landing System (ILS), and a vision sensing system, a processor, a communication device, and computer-readable memory. In operation, the system receives one or more radio signals from the ILS, one or more GNSS signals from the GNSS, and one or more vision sensor signals from the vision sensing system. The system evaluates, via the processor, the received signals to generate an aircraft landing profile indicative of the method of automatically landing the aircraft. The system transmits the aircraft landing profile to the aircraft landing controller. The system can provide automatic landings for any approach type including on runways without published instrument approaches.

19 Claims, 4 Drawing Sheets

(56) References Cited

U.S. PATENT DOCUMENTS

| | | | | |
|---|---|---|---|---|
| 11,163,320 | B1 | 11/2021 | Tiana et al. | |
| 11,532,237 | B2 | 12/2022 | Tiana et al. | |
| 11,862,029 | B2 | 1/2024 | Haskins et al. | |
| 2022/0309933 | A1 | 9/2022 | Pastre et al. | |
| 2023/0023069 | A1* | 1/2023 | Gariel | G06T 7/74 |
| 2023/0063241 | A1* | 3/2023 | Chippa | G08G 5/54 |

* cited by examiner

AUTOLAND ANYWHERE SYSTEM

BACKGROUND

Automated landing systems for aircraft are used to guide an aircraft along a determined path to successfully land at a landing site. In some cases, an automated landing system can use on board hardware to interface with an external navigation system to generate an automatic landing path while accounting and adjusting for deviations from the desired path. For example, the aircraft can rely on an instrument landing system (ILS) which provides glideslope and localizer information to compute deviations. It is, however, desirable to have a multitude of sensor options beyond, for example, an ILS. A multitude of sensor options allow for the aircraft to have additional landing options in a case where ILS infrastructure is not present, or in cases where additional landing data integrity is desired.

SUMMARY

A system for determining an automatic landing path for an aircraft includes an aircraft landing controller, a network of sensing systems comprising a Global Navigation Satellite System (GNSS), an Instrument Landing System (ILS), and a vision sensing system, a processor, computer-readable memory, and a communication device operably connected to the processor, the network of sensing systems, and the aircraft landing controller. The computer-readable memory is operably connected to the processor and is encoded with instructions that, when executed by the processor, cause the system to perform the following steps. The system receives, via the communication device, one or more radio signals from the ILS. The system receives, via the communication device, one or more GNSS signals from the GNSS. The system receives, via the communication device, one or more vision sensor signals from the vision sensing system. The system evaluates, via the processor, the one or more radio signals, the one or more GNSS signals, and the one or more vision sensor signals to generate an aircraft landing profile, wherein the aircraft landing profile is indicative of the method of automatically landing the aircraft. The system transmits, via the communication device, the aircraft landing profile to the aircraft landing controller.

A method for determining an automatic landing path for an aircraft includes receiving, via a communication device, one or more radio signals from an Instrument Landing System (ILS). The method further includes receiving, via the communication device, one or more Global Navigation Satellite System (GNSS) signals from a GNSS. The method further includes receiving, via the communication device, one or more vision sensor signals from a vision sensing system. The method further includes evaluating, via a processor, the one or more radio signals, the one or more GNSS signals, and the one or more vision sensor signals to generate an aircraft landing profile, wherein the aircraft landing profile is indicative of the method of automatically landing the aircraft. The method further includes transmitting, via the communication device, the aircraft landing profile to the aircraft landing controller.

DETAILED DESCRIPTION

The techniques of this disclosure relate to a system for automatically landing an aircraft. The system for automatically landing the aircraft uses a plurality of sources to determine a landing path. The plurality of sources can include an Instrument Landing System (ILS) (and/or a millimeter wave-based landing sensor), a Global Navigation Satellite System (GNSS), and a vision sensor system (e.g., a vision sensor, radar, laser-based sensor, and/or other vision-based technologies). The system selects a primary source from the plurality of sources to be used to automatically land the aircraft based upon various factors including but not limited to an aircraft operator selection, data integrity, and available external systems. Other sources can be used as backup sources and additionally or alternatively be used to aid in the computation of the landing path and deviations of the primary source. In other embodiments, multiple sources can be used in combination as the primary source. Upon determining the primary source, the landing profile (e.g., the landing path and deviations) is used to calculate deviations of the aircraft from the flight path and are transmitted to the airborne aircraft landing controller for automatic landing of the aircraft. This disclosure assumes that other sensors typically available on an aircraft, such as inertial data, air data, etc., are also available and used as needed by the automatic landing system.

The techniques of this disclosure allow for a fully encompassing system that can carry out automated landings in many different scenarios and using various different approach types. In some examples, the techniques of this disclosure involve generating an automatic landing path for ILS category I, II, IIIa, and IIIb approaches, RNAV (Area Navigation) Localizer Performance with Vertical Guidance (LPV) approaches, RNAV Vertical Navigation (VNAV) approaches, RNAV Lateral Navigation (LNAV) approaches, RNAV Required Navigation Performance (RNP) approaches, non-precision approaches, non-published approaches, and/or emergency landing approaches. The listed approaches are merely examples and are intended to be non-limiting. Other possible approach types are contemplated by this disclosure.

Figure 1:
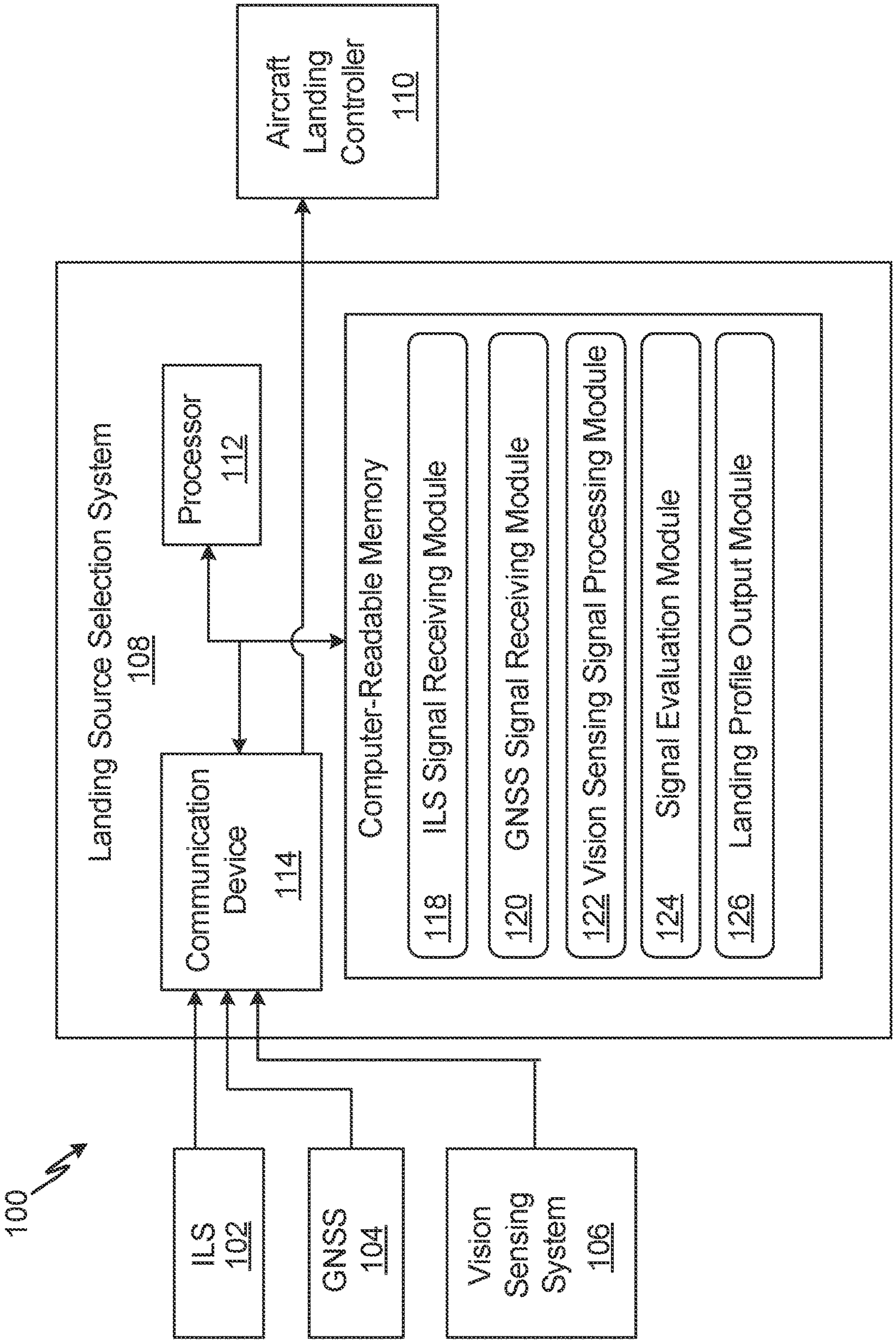
FIG. 1 is a schematic view of a system for automatically landing an aircraft.

FIG. 1 is a schematic view of system 100 for automatically landing an aircraft. System 100 includes Instrument Landing System (ILS) 102, Global Navigation Satellite System (GNSS) 104, vision sensing system 106, landing source selection system 108, and aircraft landing controller 110. Landing source selection system 108 includes processor 112, communication device 114, and computer-readable memory 116. Computer-readable memory 116 includes ILS signal receiving module 118, GNSS signal receiving module 120, vision sensing signal processing module 122, signal evaluation module 124, and landing profile output module 126.

Processor 112, in some examples, is configured to implement functionality and/or process instructions for execution within system 100. For instance, processor 112 can be capable of processing instructions stored in computer-readable memory 116. Examples of processor 112 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 116, in some examples, is described as computer-readable storage media. In some examples, a computer-readable storage medium includes a non-transitory medium. The term "non-transitory" indicates that the storage medium is not embodied in a carrier wave or a propagated signal. In certain examples, a non-transitory storage medium stores data that, over time, changes (e.g., in RAM or cache). In some examples, computer-readable memory 116 is a temporary memory, meaning that a primary purpose of computer-readable memory 116 is not long-term storage. Computer-readable memory 116, in some examples, is described as volatile memory, meaning that computer-readable memory 116 does not maintain stored contents when electrical power to computer-readable memory 116 is removed. Examples of volatile memories can include random access memories (RAM), dynamic random access memories (DRAM), static random access memories (SRAM), and other forms of volatile memories. In some examples, computer-readable memory 116 is used to store program instructions for execution by processor 112. Computer-readable memory 116, in one example, is used by software or applications to temporarily store information during program execution. Computer-readable memory 116, in some examples, also includes one or more computer-readable storage media. Computer-readable memory 116 is configured to store larger amounts of information than volatile memory. Computer-readable memory 116 is further configured for long-term storage of information. In some examples, computer-readable memory 116 includes non-volatile storage elements. Examples of such non-volatile storage elements include, but are not limited to, magnetic hard discs, optical discs, flash memories, or forms of electrically programmable memories (EPROM) or electrically erasable and programmable (EEPROM) memories.

Communication device 114 is an input and/or output device that allows landing source selection system 108 to electrically communicate with ILS 102, GNSS 104, vision sensing system 106, and aircraft landing controller 110. Communication device 114 can include a network interface card (NIC), a modem, a bridge, a hub, and/or a router, which may communicate with other network-attached components via wired and/or wireless connections.

ILS 102 is operably connected to landing source selection system 108 via an operable connection between ILS 102 and communication device 114. GNSS 104 is operably connected to landing source selection system 108 via an operable connection between GNSS 104 and communication device 114. Vision sensing system 106 is operably connected to landing source selection system 108 via an operable connection between vision sensing system 106 and communication device 114. Aircraft landing controller 110 is operably connected to landing source selection system 108 via an operable connection between aircraft landing controller 110 and communication device 114. Processor 112, communication device 114, and computer-readable memory 116 are interconnected within landing source selection system 108.

In operation, computer-readable memory 116 is encoded with instructions that are executed by processor 112. Computer-readable memory 116 includes ILS signal receiving module 118. ILS signal receiving module 118 includes one or more programs containing instructions to receive an input from ILS 102 via communication device 114. Upon execution of ILS signal receiving module 118, data (i.e., from ILS 102) is received by processor 112.

The data received from ILS 102 can be data from a radio-based navigation system for landing the aircraft. Such data can, for example, include a localizer radio signal, wherein the localizer radio signal is indicative of a horizontal guidance towards a landing site (e.g., a runway). Such data can also, for example, include a glideslope radio signal, wherein the glideslope radio signal is indicative of a vertical guidance towards the landing site. The data received from ILS 102 can also include distance measurements based on marker beacons or distance measuring equipment to determine the distance remaining to the landing site. The data received from ILS 102 can be used to calculate a deviation (e.g., a horizontal deviation and vertical deviation) from the desired landing path.

Computer-readable memory 116 further includes GNSS signal receiving module 120. GNSS signal receiving module 120 includes one or more programs containing instructions to receive an input from GNSS 104 via communication device 114. Upon execution of GNSS signal receiving module 120, data (i.e., from GNSS 104) is received by processor 112.

The data received from GNSS 104 can be data from a satellite-based navigation system for landing the aircraft. In some embodiments, a satellite-based augmentation system (SBAS) or ground-based augmentation system (GBAS) can be used to enhance the quality and provide integrity assurance to the GNSS data from GNSS 104. The data received from GNSS 104 can, for example, include published approach data, wherein the published approach data includes a database of three-dimensional points mapped in space such that a geometric path to the landing site can be determined. In some embodiments, no published approach data exists, and instead the data received from GNSS 104 can alternatively include a synthesized geometric path to the landing site, wherein the synthesized geometric path is based upon a real-time calculation of a path towards a known landing site. The data received from GNSS 104 can also, for example, include satellite data indicative of positional parameters of the aircraft. The positional parameters can include a latitude, longitude, and altitude of the aircraft. The data received from GNSS 104 can be used to calculate a deviation (e.g., a horizontal deviation and vertical deviation) from the desired landing path. Additional description regarding the calculation of such a deviation based upon the data received from GNSS 104 is provided below in the description of FIG. 2.

Computer-readable memory 116 further includes vision sensing signal processing module 122. Vision sensing signal processing module 122 includes one or more programs containing instructions to receive an input from vision sensing system 106 via communication device 114. Upon execution of vision sensing signal processing module 122, data (i.e., from vision sensing system 106) is received by processor 112.

Vision sensing system 106 can include one or more forward looking sensors in space to visually detect the landing site in front of the aircraft. Sensors within vision sensing system 106 can include but are not limited to infrared sensors, radio detection and ranging sensors (radar), laser-based sensors, and/or vision sensors. The data received from vision sensing system 106 can be used to map a path to the landing site. The data received from vision sensing system 106 can be used to calculate a deviation (e.g., a horizontal deviation and vertical deviation) from the desired landing path.

Computer-readable memory 116 further includes signal evaluation module 124. Signal evaluation module 124 includes one or more programs containing instructions to evaluate the signals received from ILS 102, GNSS 104, and vision sensing system 106 in order to generate an automatic aircraft landing profile to convey to aircraft landing controller 110. Upon execution of signal evaluation module 124, processor 112 determines a primary landing source from ILS 102, GNSS 104, and vision sensing system 106, wherein the primary source is used to generate an automatic aircraft landing profile. In some embodiments, the primary source is determined based upon a selection of the aircraft operator. In some embodiments, the primary source is determined based upon an availability of ILS 102, GNSS 104, and vision sensing system 106. Thus, in one example, in a case where SBAS coverage does not exist, signal evaluation module 124 can remove the GNSS data from consideration. In another example, in a case where an airport landing site does not have ILS infrastructure, signal evaluation module 124 can remove the ILS data from consideration. In still other embodiments, the primary source is determined based upon a deviation selection algorithm. The deviation selection algorithm can, for example, select the primary source which has the least amount of error as determined by a monitor. The preceding examples are merely intended to be illustrative and it is understood that other forms of signal evaluation can be used to prioritize a landing approach.

In some embodiments, upon execution of signal evaluation module 124, a secondary source is also selected from ILS 102, GNSS 104, and vision sensing system 106. The secondary source is used as a secondary method of automatically landing the aircraft. In some embodiments, upon execution of signal evaluation module 124, more than one of ILS 102, GNSS 104, and vision sensing system 106 are used to generate an automatic aircraft landing profile. In one example, GNSS 104 (e.g., an SBAS-enhanced GNSS signal) can be used to generate a landing profile and vision sensing system 106 can be used to enhance the accuracy of the GNSS signal thereby enhancing the accuracy of the deviations within the automatic landing profile. Another simple example is where all available GNSS, ILS, and Vision sensors are averaged or combined using a Kalman filter or other means. The preceding examples are merely intended to be illustrative and it is understood that other combinations can be used to generate the automatic landing profile.

In some embodiments, upon execution of signal evaluation module 124, processor 112 evaluates the tracking errors of the various landing sources. Thus, a tracking error can be determined for each of ILS 102, GNSS 104, and vision sensing system 106. The tracking error for a given approach can be indicative of whether it is a viable approach. Thus, for example, if the tracking error of ILS 102 exceeds an error threshold, a different landing source can be used. Further, if the tracking error occurs during the automatic landing and other sources are not available, the automatic landing can be aborted, or a go-around procedure can be implemented.

Computer-readable memory 116 further includes landing profile output module 126. Landing profile output module 126 includes one or more programs containing instructions to output the automatic aircraft landing profile. Upon execution of landing profile output module 126, the automatic aircraft landing output profile generated by the execution of signal evaluation module 124 is output to aircraft landing controller 110 via communication device 114. The automatic aircraft landing profile can include an indication of the primary landing source and the associated deviations from the landing path. The automatic aircraft landing profile can additionally include a secondary landing source and the associated deviations therein. The automatic aircraft landing profile can alternatively include a combination of sources as the primary landing source and the associated deviations therein.

System 100 provides various advantages. Primarily, system 100 provides the advantage of an automatic landing system for an aircraft with various sources, thereby allowing for expanded landing capabilities. Thus, in a scenario where a certain type of approach is not viable due to insufficient infrastructure (e.g., no ILS airport infrastructure) or insufficient coverage (e.g., no SBAS/GBAS coverage available for GNSS), other sources can be used to automatically land the aircraft. Further, the existing landing systems can be enhanced by using the additional sources to improve accuracy and reliability. Thus, for example, vision sensing system 106 can be used to enhance the accuracy and reliability of GNSS 104. Through such techniques, system 100 can expand the number of landings that can be considered high-integrity, thereby expanding the use of auto-landing in both emergency and non-emergency landing scenarios. Further, the enhanced accuracy and reliability of such landing systems can allow for a greater portion of the landing approach to be automated. Thus, for example, the final few-hundred feet of an approach which is traditionally flown manually, can now be automated due to the high-integrity landing capabilities available via system 100.

Figure 2:
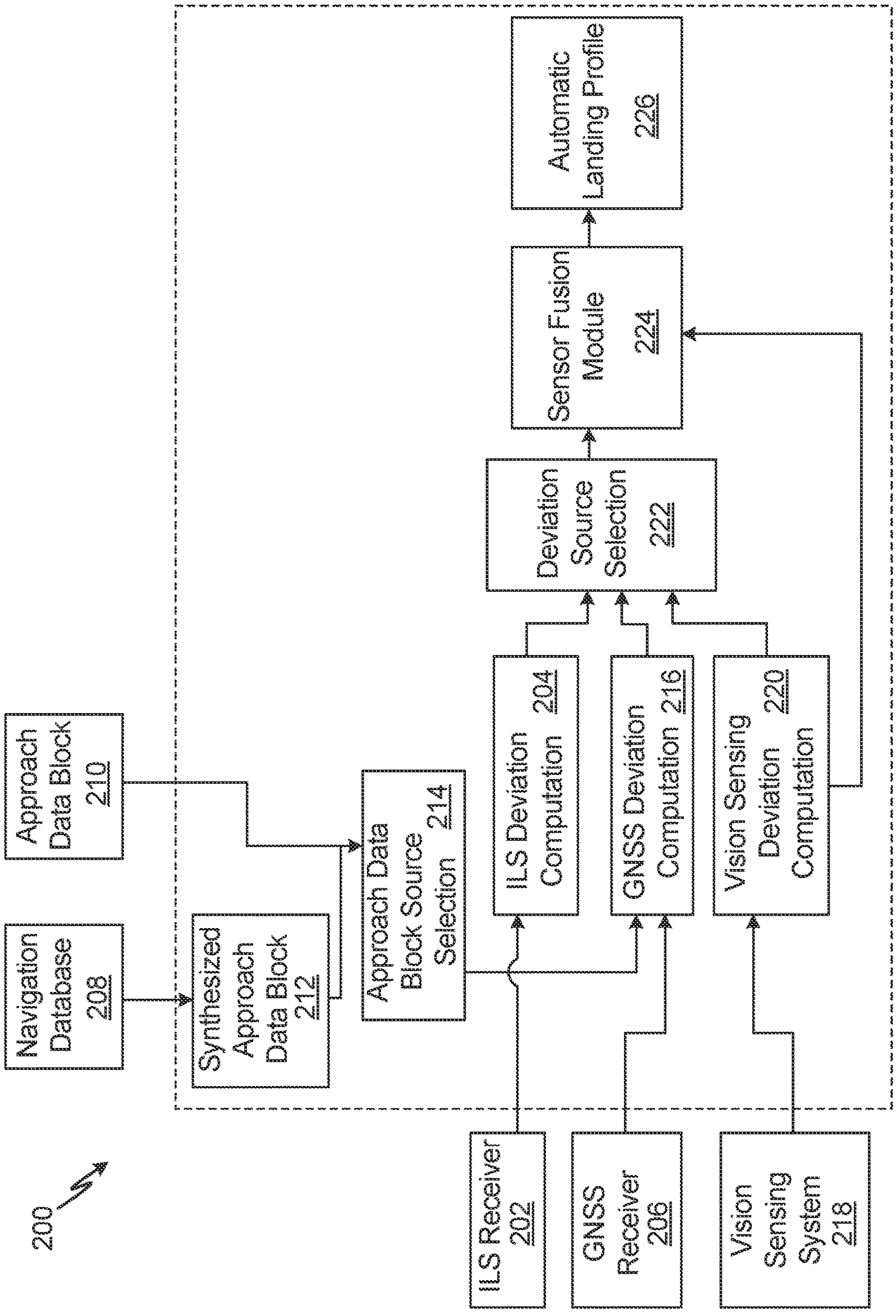
FIG. 2 is a block diagram of the system for automatically landing an aircraft.

FIG. 2 is a block diagram of the system 200 for automatically landing an aircraft. System 200 is a more detailed depiction of system 100, including a more detailed depiction of an implementation of GNSS 104. System 200 includes ILS receiver 202 and ILS deviation computation 204. System 200 further includes GNSS receiver 206, navigation database 208, approach data block 210, synthesized approach data block 212, GNSS data block source selection 214, and GNSS deviation computation 216. System 200 further includes vision sensing system 218 and vision sensing deviation computation 220. System 200 further includes deviation source selection 222, sensor fusion module 224, and automatic landing profile 226.

In operation, system 200 can collect data from ILS receiver 202. ILS receiver 202 is akin to ILS 102 as described with respect to FIG. 1. The data received from ILS receiver 202 can, for example, include a localizer radio signal, wherein the localizer radio signal is indicative of a horizontal guidance towards a landing site (e.g., a runway). The data can also, for example, include a glideslope radio signal, wherein the glideslope radio signal is indicative of a vertical guidance towards the landing site. The compiled deviation data from ILS receiver 202 is depicted as ILS deviation computation 204.

System 200 also collects data from a GNSS system, such as GNSS system 104 of FIG. 1. The GNSS system can require a two-part approach to determining GNSS deviation computation 216. The first part in determining GNSS deviation computation 216 is the determination of the aircraft position. The aircraft position can be determined by GNSS receiver 206, wherein GNSS receiver 206 is a receiver in communication with a satellite (not depicted) to obtain a latitude, a longitude, and an altitude of the aircraft that may be augmented using satellite-based or ground-based augmentation.

The second part in determining GNSS deviation computation 216 is the approach data. In some embodiments, the approach data is published, for example, in a third-party database and is depicted as approach data block 210. Approach data block 210 can include a set of three-dimensional points mapped in space such that a geometric path to the landing site can be determined.

In some embodiments, no published approach data exists, and instead navigation database 208 can include an indicator of the location of the landing site. Thereafter, synthesized approach data block 212 can be generated by synthesizing a geometric path to the landing site based upon a real-time calculation of a path towards the location of the landing site, the location of the landing site being known from navigation database 208. In one embodiment, the synthesis of a geometric path to the landing site includes calculating the latitude and longitude of a landing threshold point (LTP) based upon the radial distance from the aircraft to the LTP and the bearing angle (α) of the aircraft relative to the LTP. Upon determining the LTP, the latitude and longitude of a flight path alignment point (FPAP) can be calculated from the LTP, the runway length, and the runway heading. The FPAP is indicative of a point at the end of the runway. Using the same parameters, the latitude and longitude of a global navigation satellite system azimuth reference point (GARP) can also be determined. The GARP is indicative of a virtual point at which a localizer antenna would be located in an ILS automatic landing system. Thus, the synthesized parameters can produce an emulated ILS localizer signal using GNSS data. An alternative method is to obtain latitude, longitude, and altitude of the LTP at both ends of the runway directly from a database and use the LTP at the far end of the runway as the FPAP to construct the desired approach path.

Additionally, the vertical parameters can be determined via calculation. In one embodiment, the vertical parameters are determined by assuming an average glide path angle, an average course width, and an average threshold crossing height, and using trigonometric properties to determine the glide path interception point. The glide path interception point is indicative of the point at which the plan contacts the runway on the vertical axis. Thus, both the horizontal and vertical deviations can be determined from synthesized approach data block 212. The preceding calculations to determine synthesized approach data block 212 are merely intended to be an example, and it is understood to those of skill in the art that other formulae and mathematical approaches can be used to determine approach data.

Approach data block selection algorithm 214 selects between either the approach data block 210 (i.e., based upon published approach data) or the synthesized approach data block 212 (i.e., based upon synthesized approach data). In some embodiments, approach data block 210 is preferable to synthesized approach data block 212, and synthesized approach data block 212 is selected in the absence of any published approach data (e.g. non-published approaches). Upon selecting a source for the approach data, and upon determining the aircraft position via GNSS receiver 206, a GNSS based deviation computation 216 can be determined.

System 200 also collects vision sensor data via vision sensing system 218. Vision sensing system 218 is akin to vision sensing system 106 of FIG. 1. Vision sensing system 218 can include sensors (e.g., infrared sensors, radar, and/or vision sensors) configured to visually detect the landing site in front of the aircraft. The data received from vision sensing system 218 is used to generate vision sensing deviation computation 220.

ILS deviation computation 204, GNSS deviation computation 216, and vision sensing deviation computation 220 are input into deviation source selection 222. Deviation source selection 222 can select a source for the deviation based upon a selection of the aircraft operator, based upon an availability of an ILS, GNSS or vision-based system, and/or based upon a deviation selection algorithm. The deviation selection algorithm can, for example, select the source which has the least amount of error in the landing path. The preceding examples are merely intended to be illustrative and it is understood that other criteria can be used to select a deviation source.

Sensor fusion module 224 can receive the deviation source from deviation source selection 222. Sensor fusion module 224 can fuse the inputs of various deviation sources in order to enhance the accuracy and reliability of the selected automatic landing source. As depicted within system 200, sensor fusion module 224 also receives input from vision sensing deviation computation 220. In some examples, vision sensing deviation computation 220 can be used to enhance the deviations received from ILS deviation computation 204, GNSS deviation computation 216, or a combination of ILS deviation computation 204 and GNSS deviation computation 216. The output of sensor fusion module 224 is then output as automatic landing profile 226. Automatic landing profile 226 can be transmitted, for example, to aircraft landing controller 110 of FIG. 1 for automatic landing of the aircraft.

System 200 is a more detailed embodiment of system 100 and thus provides many of the same advantages. System 200 also provides the advantage of generating synthetic GNSS approach data in the absence of published GNSS approach data. In doing so, the number of runways on which an automatic landing can be performed is increased. For example, system 200 can be used to automatically land an aircraft at an airport that does not have any published instrument approach. Therefore, the overall usability of system 200 is enhanced.

Figure 3:
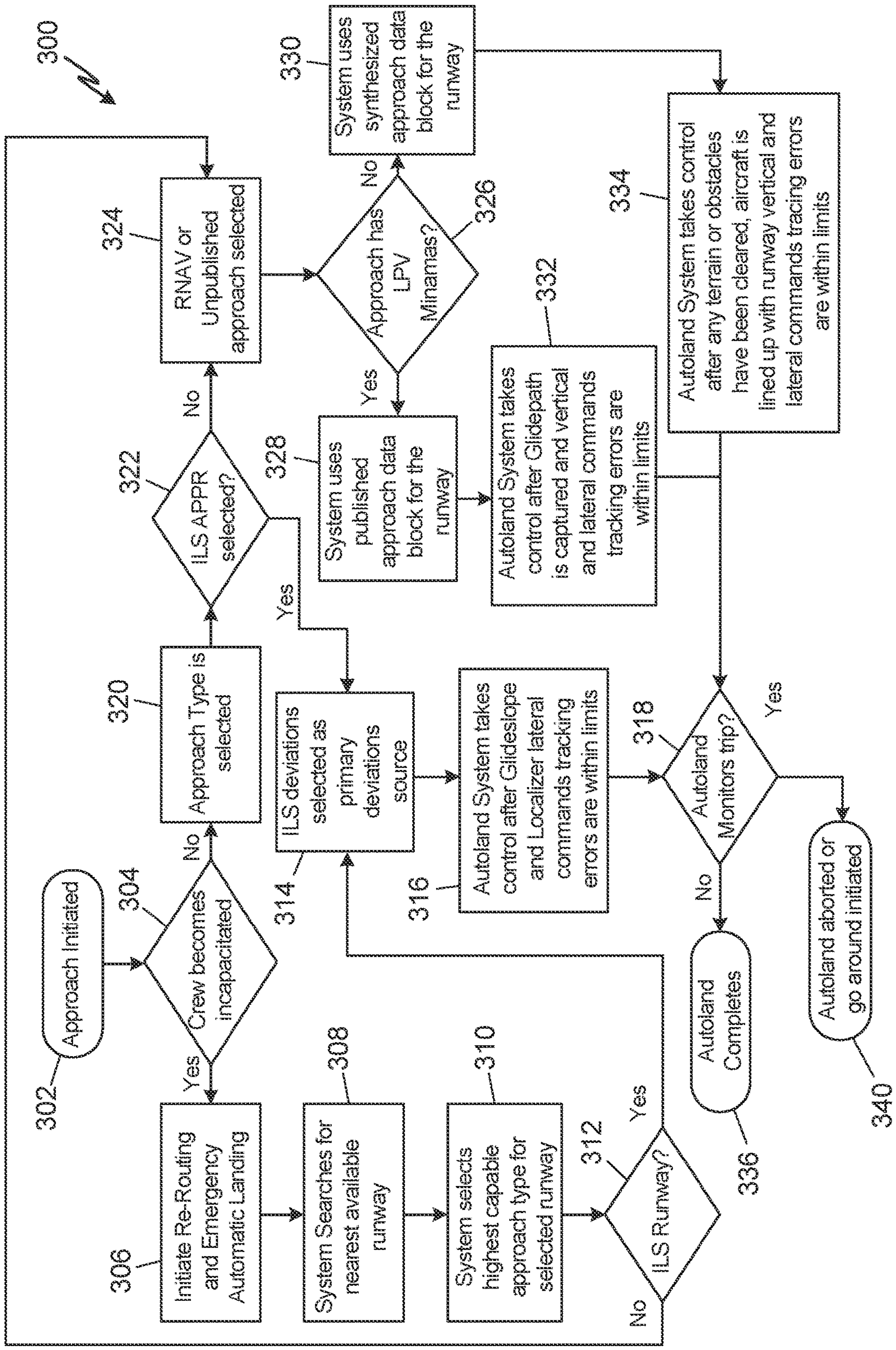
FIG. 3 is a flowchart depicting a method for determining a landing strategy in emergency and non-emergency situations.

FIG. 3 is a flowchart depicting method 300 for determining a landing strategy in emergency and non-emergency situations. Within the description of method 300, reference will be made to the component numbers of system 100 for clarity.

Method 300 begins at step 302 when an approach is initiated. An approach can be initiated when an aircraft is in the landing stage of a flight. At decision step 304, a determination is made as to whether an emergency condition exists (e.g., the crew becoming incapacitated). If an emergency condition does exist, method 300 continues to step 306.

At step 306, an emergency automatic landing sequence is initiated. At step 308, system 100 searches for the nearest available runway for an emergency landing. At step 310, system 100 selects, via the execution of signal evaluation module 124, the desired approach type for the selected runway. The desired approach type can be determined based upon an availability of approach systems, and/or based upon a deviation selection algorithm. In the depicted example of method 300, the available approach systems are ILS 102 and GNSS 104. At decision step 312, system 100 determines if ILS 102 is selected and available. In some embodiments, system 100 defaults to ILS 102 as the desired approach in an emergency condition, and only defers to a secondary source, such as GNSS 104, if the primary source, ILS 102, is unavailable.

If ILS 102 is selected and available, method 300 proceeds to step 314, in which the ILS deviation values are computed and the ILS deviations are selected as the primary deviation source. If ILS 102 is not selected and/or not available, method 300 proceeds to step 324 in which a GNSS approach is selected.

In a non-emergency condition, method 300 proceeds from decision step 304 to step 320 at which the approach type is selected via execution of signal evaluation module 124. Again, the approach type can be determined based upon a pre-selection of the aircraft operator, based upon an availability of approach systems, and/or based upon a deviation selection algorithm. Method 300 proceeds to step 322, wherein the system determines whether an ILS approach is selected. If an ILS approach is selected, method 300 proceeds to step 314, in which the ILS deviation values are computed and the ILS deviations are selected as the primary deviation source. If ILS 102 is not selected and/or not available, method 300 proceeds to step 324 in which a GNSS approach is selected.

In either the emergency or non-emergency case in the depiction of method 300, the path through step 314 is followed in the case of an ILS approach, and the path through step 324 is followed in the case of a GNSS approach. In the case of an ILS approach, at step 314, the ILS deviations are determined and selected as the deviation source. At step 316, the system takes control after glideslope and localizer lateral command tracking errors are within limits. At decision step 318, the system evaluates whether the error is outside the acceptable range. If the error is outside the acceptable range, at step 340 the automatic landing is aborted, or a go-around maneuver is initiated. If the error is within the acceptable range, at step 336, the automatic landing is completed.

In the case of a GNSS approach, the path through step 324 is followed. At decision step 326, the system determines whether published data exists for the GNSS approach, wherein the published data includes a set of three-dimensional points mapped in space such that a geometric path to the landing site can be determined. If published data does exist, at step 328, the system uses the published data to map the landing path. At step 332, the system takes control after the glidepath is captured and vertical and lateral command tracking errors are within limits. At decision step 318, the system evaluates whether the error is outside the acceptable range. If the error is outside the acceptable range, at step 340 the automatic landing is aborted, or a go-around maneuver is initiated. If the error is within the acceptable range, at step 336, the automatic landing is completed.

If, at decision step 326, the system determines that published data does not exist for the GNSS approach, the system proceeds to step 330, wherein an approximate approach path is synthesized to create an approach data block for the runway. At step 334, the system takes control after the glidepath is captured and vertical and lateral command tracking errors are within limits. At decision step 318, the system takes control after any terrain or obstacle have been cleared, the aircraft is lined up with the runway vertical and lateral commands, and the tracking errors are within limits. If the error is outside the acceptable range, at step 340 the automatic landing is aborted, or a go-around maneuver is initiated. If the error is within the acceptable range, at step 336, the automatic landing is completed.

Method 300 is an example embodiment in which a landing strategy can be determined. Advantageously, method 300 allows for implementation in both emergency and non-emergency situations. Thus, the automatic landing can be used in a case of flight crew incapacitation, but can also be certified to a high degree of accuracy such that it can additionally be used in non-emergency cases.

Figure 4:
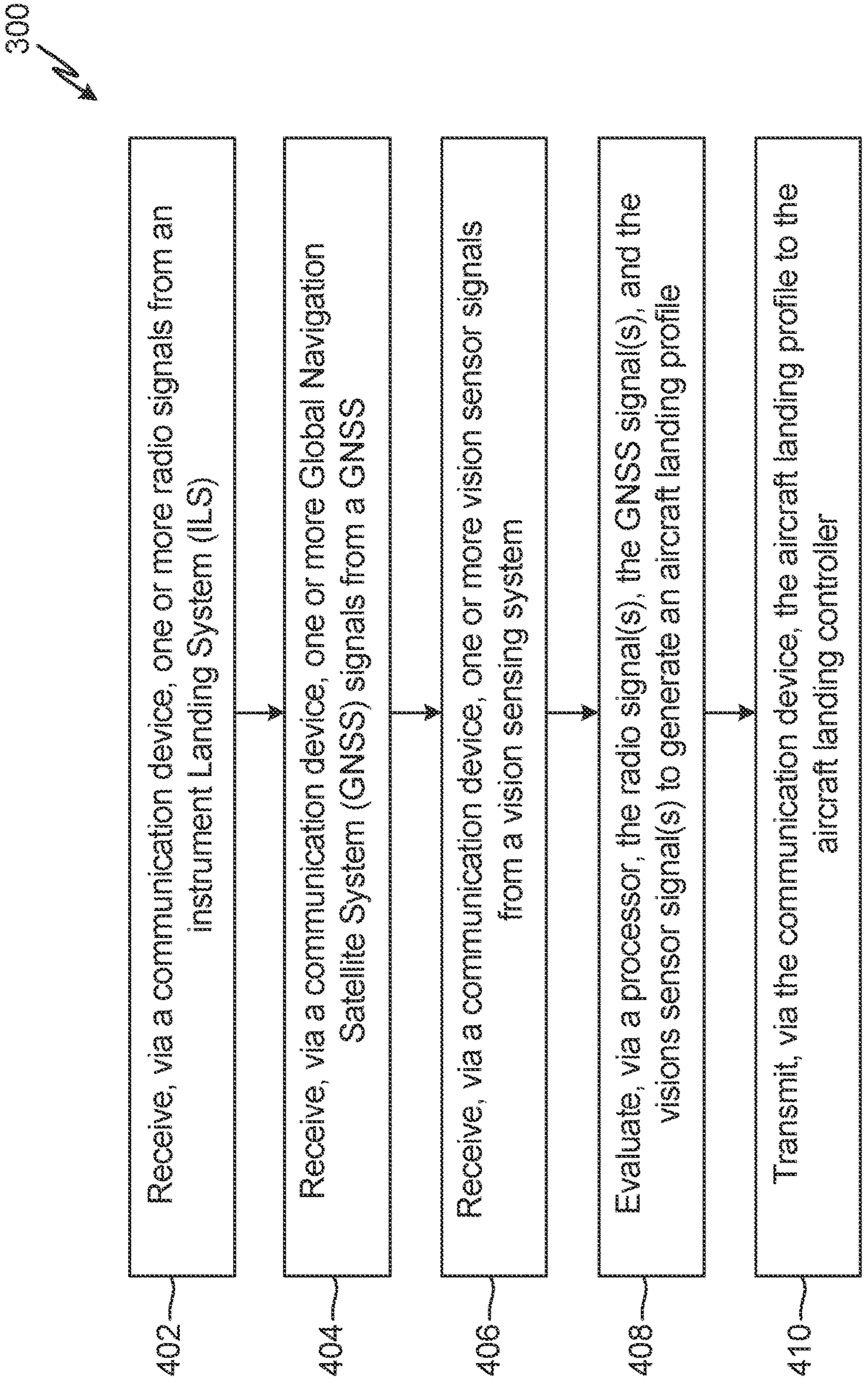
FIG. 4 is a flowchart depicting a method for automatically landing the aircraft.

FIG. 4 is a flowchart depicting method 400 for automatically landing the aircraft. Within the description of method 400, reference will be made to the component numbers of system 100 (FIG. 1) for clarity.

Method 400 begins at step 402, wherein processor 112 receives, via communication device 114, one or more radio signals from ILS 102. The radio signals received from ILS 102 can include a localizer radio signal, wherein the localizer radio signal is indicative of a horizontal guidance towards a landing site (e.g., a runway) and a glideslope radio signal, wherein the glideslope radio signal is indicative of a vertical guidance towards the landing site.

At step 404, processor 112 receives, via communication device 114, one or more GNSS signals from GNSS 104. In some embodiments, an SBAS or GBAS can be used to enhance the quality and provide integrity assurance to the GNSS data. The data received from GNSS 104 can, for example, include published approach data, wherein the published approach data includes a database of three-dimensional points mapped in space such that a geometric path to the landing site can be determined. The data received from GNSS 104 can also include a synthesized geometric path to the landing site, wherein the synthesized geometric path is based upon a real-time calculation of a path towards a known landing site. The data received from GNSS 104 can also, for example, include satellite data indicative of positional parameters of the aircraft.

At step 406, processor 112 receives, via communication device 114, one or more vision sensor signals from vision sensing system 106. Vision sensing system 106 can include one or more forward looking sensors in space to visually detect the landing site in front of the aircraft. Sensors within vision sensing system 106 can include but are not limited to infrared sensors, radio detection and ranging sensors (radar), and/or vision sensors.

At step 408, processor 112 evaluates the signals received from ILS 102, GNSS 104, and vision sensing system 106 to generate an aircraft landing profile. The aircraft landing profile can include a primary landing source determined based upon a selection of the aircraft operator, the availability of landing sources, and/or a deviation selection algorithm. The aircraft landing profile can include a secondary landing source. The aircraft landing profile can include multiple primary landing sources. In some embodiments, the aircraft landing profile can include a tracking error for one or more of the landing sources, wherein the tracking error indicates whether the landing source exceeds an error threshold. The aircraft landing profile can also include the deviation of the aircraft based upon the landing source selected.

At step 410, communication device 114 transmits the aircraft landing profile to aircraft landing controller 110. The aircraft landing controller can automatically land the aircraft based upon the received aircraft landing profile.

The techniques of this disclosure allow for an automatic aircraft landing system which has increased usability due to the multitude of landing sources available. Additionally, the automatic aircraft landing system can be used in both emergency and non-emergency cases. Further, the techniques of this disclosure allow for multiple sources to influence the automatic aircraft landing profile, thereby enhancing the accuracy and reliability of the automatic landing.

DISCUSSION OF POSSIBLE EMBODIMENTS

The following are non-exclusive descriptions of possible embodiments of the present invention.

A system for determining an automatic landing path for an aircraft includes an aircraft landing controller, a network of sensing systems comprising a Global Navigation Satellite System (GNSS), an Instrument Landing System (ILS), and a vision sensing system, a processor, a communication device operably connected to the processor, the network of sensing systems, and the aircraft landing controller, and computer-readable memory. The computer-readable memory is operably connected to the processor and is encoded with instructions that, when executed by the processor, cause the system to perform the following steps. The system receives, via the communication device, one or more radio signals from the ILS. The system receives, via the communication device, one or more GNSS signals from the GNSS receiver. The system receives, via the communication device, one or more vision sensor signals from the vision sensing system. The system evaluates, via the processor, the one or more radio signals, the one or more GNSS signals, and the one or more vision sensor signals to generate an aircraft landing profile, wherein the aircraft landing profile is indicative of the method of automatically landing the aircraft. The system transmits, via the communication device, the aircraft landing profile to the aircraft landing controller.

The system of the preceding paragraph can optionally include, additionally and/or alternatively, any one or more of the following features, configurations and/or additional components:

A further embodiment of the foregoing system, wherein the aircraft landing profile comprises a primary source, wherein the primary source is selected from the ILS, the GNSS system, and the vision sensor system, and wherein the primary source is used as the method of automatically landing the aircraft.

A further embodiment of any of the foregoing systems, wherein the primary source is determined based upon a selection by an aircraft operator.

A further embodiment of any of the foregoing systems, wherein the primary source is determined based upon data availability of the ILS, the GNSS, and the vision sensing system.

A further embodiment of any of the foregoing systems, wherein the primary source is determined based upon a deviation selection algorithm.

A further embodiment of any of the foregoing systems, wherein the aircraft landing profile comprises a secondary source, wherein the secondary source is selected from the ILS, the GNSS, and the vision sensing system, and wherein the secondary source is used as a secondary method of automatically landing the aircraft.

A further embodiment of any of the foregoing systems, wherein the aircraft landing profile uses more than one of the ILS, the GNSS, and the vision sensing system within the method of automatically landing the aircraft.

A further embodiment of any of the foregoing systems, wherein the GNSS uses a satellite-based augmentation system (SBAS) or ground-based augmentation system (GBAS) to enhance an accuracy of the one or more GNSS signals.

A further embodiment of any of the foregoing systems, wherein the one or more GNSS is based on published navigation approach data to compute emulated ILS deviations.

A further embodiment of any of the foregoing systems, wherein the one or more GNSS is based on synthesized navigation approach data to compute emulated ILS deviations.

A further embodiment of any of the foregoing systems, wherein the synthesized navigation approach data is calculated by using a known point on a landing site to calculate a real time landing path.

A further embodiment of any of the foregoing systems, wherein the synthesized navigation approach data is further calculated by using the one or more vision sensor signals to calculate the real time landing path.

A further embodiment of any of the foregoing systems, wherein a GNSS receiver is used to determine a plurality of position data of the aircraft.

A further embodiment of any of the foregoing systems, wherein the plurality of position data includes a latitude, a longitude, and an altitude.

A further embodiment of any of the foregoing systems, wherein the plurality of position data and navigation approach data is used to calculate a deviation from a landing path.

A further embodiment of any of the foregoing systems, wherein the vision sensor system comprises an infrared sensor, a radio detection and ranging sensor, and/or a vision sensor.

A method for determining an automatic landing path for an aircraft includes receiving, via a communication device, one or more radio signals from an Instrument Landing System (ILS). The method further includes receiving, via the communication device, one or more Global Navigation Satellite System (GNSS) signals from a GNSS. The method further includes receiving, via the communication device, one or more vision sensor signals from a vision sensing system. The method further includes evaluating, via a processor, the one or more radio signals, the one or more GNSS signals, and the one or more vision sensor signals to generate an aircraft landing profile, wherein the aircraft landing profile is indicative of the method of automatically landing the aircraft. The method further includes transmitting, via the communication device, the aircraft landing profile to the aircraft landing controller.

A further embodiment of the foregoing method, wherein the aircraft landing profile comprises a primary source, wherein the primary source is selected from the Instrument Landing System, the GNSS system, and the vision sensor system, and wherein the primary source is used as the method of automatically landing the aircraft.

A further embodiment of any of the foregoing methods, wherein the automatic landing path can be determined for ILS category I, II, IIIa, and IIIb approaches, RNAV (Area Navigation) Localizer Performance with Vertical Guidance (LPV) approaches, RNAV Vertical Navigation (VNAV) approaches, RNAV lateral navigation (LNAV) approaches, RNAV Required Navigation Performance (RNP) approaches, non-precision approaches, non-published approaches, and/or emergency landing approaches.

A method for synthetizing an approach data block includes receiving a location indicator for a landing site. The method further includes receiving navigation parameters and airport parameters generated during airborne operations. The method further includes synthesizing a geometric path to the landing site based upon the navigation parameters and the airport parameters. The method further includes generating an emulated Instrument Landing System localizer signal based upon the geometric path.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining an automatic landing path for an aircraft, the system comprising:
- an aircraft landing controller;
- a network of sensing systems comprising a Global Navigation Satellite System (GNSS), an Instrument Landing System (ILS), and a vision sensing system;
- a processor;
- a communication device operably connected to the processor, the network of sensing systems, and the aircraft landing controller; and
- computer-readable memory operably connected to the processor, the computer-readable memory encoded with instructions that, when executed by the processor, cause the system to:
  - receive, via the communication device, one or more radio signals from the ILS;
  - receive, via the communication device, one or more GNSS signals from the GNSS;
  - receive, via the communication device, one or more vision sensor signals from the vision sensing system;
  - evaluate, via the processor, the one or more radio signals, the one or more GNSS signals, and the one or more vision sensor signals;
  - select at least one primary information source, from the GNSS, the ILS, and
    - the vision sensing systems, based upon the evaluation of the one or more radio signals from the ILS, the one or more GNSS signals from the GNSS, and the one or more vision sensor signals from the vision sensing system;
  - generate an aircraft landing profile that includes a method of automatically landing the aircraft utilizing the selected at least one primary information source; and
  - transmit, via the communication device, the aircraft landing profile to the aircraft landing controller.

2. The system of claim 1, wherein the computer-readable memory is encoded with further instructions that, when executed by the processor, cause the system to:
- select at least one secondary information source, from the GNSS, the ILS, and the vision sensing systems, based upon the evaluation of the one or more radio signals from the ILS, the one or more GNSS signals from the GNSS, and the one or more vision sensor signals from the vision sensing system;
- wherein the aircraft landing profile includes a second method of automatically landing the aircraft utilizing the selected at least one secondary information source.

3. The system of claim 1, wherein the primary source is selected based upon a selection by an aircraft operator.

4. The system of claim 1, wherein the primary source is selected based upon data availability of the ILS, the GNSS, and the vision sensing system.

5. The system of claim 1, wherein the primary source is selected based upon a deviation selection algorithm.

6. The system of claim 1, wherein the aircraft landing profile utilizes more than one of the ILS, the GNSS, and the vision sensing system within the method of automatically landing the aircraft.

7. The system of claim 1, wherein the GNSS uses a satellite-based augmentation system (SBAS) or ground-based augmentation system (GBAS) to enhance an accuracy of the one or more GNSS signals.

8. The system of claim 7, wherein a GNSS receiver is used to determine a plurality of position data of the aircraft.

9. The system of claim 8, wherein the plurality of position data includes a latitude, a longitude, and an altitude.

10. The system of claim 9, wherein the plurality of position data and navigation approach data is used to calculate a deviation from a landing path.

11. The system of claim 1, wherein the one or more GNSS signals is based on published navigation approach data to compute emulated ILS deviations.

12. The system of claim 1, wherein the one or more GNSS signals is based on synthesized navigation approach data to compute emulated ILS deviations.

13. The system of claim 12, wherein the synthesized navigation approach data is calculated by using a known point on a landing site to calculate a real time landing path.

14. The system of claim 13, wherein the synthesized navigation approach data is further calculated by using the one or more vision sensor signals to calculate the real time landing path.

15. The system of claim 1, wherein the vision sensor system comprises an infrared sensor, a radio detection and ranging sensor, a laser-based sensor, and/or a vision sensor.

16. A method for determining an automatic landing path for an aircraft, the method comprising:
- receiving, via a communication device, one or more radio signals from an Instrument Landing System (ILS);
- receiving, via the communication device, one or more Global Navigation Satellite System (GNSS) signals from a GNSS;
- receiving, via the communication device, one or more vision sensor signals from a vision sensing system;
- evaluating, via a processor, the one or more radio signals, the one or more GNSS signals, and the one or more vision sensor signals;
- selecting at least one primary information source, from the GNSS, the ILS, and the vision sensing systems, based upon the evaluation of the one or more radio signals from the ILS, the one or more GNSS signals from the GNSS, and the one or more vision sensor signals from the vision sensing system;
- generating an aircraft landing profile that includes a method of automatically landing the aircraft utilizing the selected at least one primary information source; and
- transmitting, via the communication device, the aircraft landing profile to an aircraft landing controller.

17. The method of claim 16, and further comprising:
- selecting at least one secondary information source, from the GNSS, the ILS, and the vision sensing systems, based upon the evaluation of the one or more radio signals from the ILS, the one or more GNSS signals from the GNSS, and the one or more vision sensor signals from the vision sensing system;
- wherein the aircraft landing profile includes a second method of automatically landing the aircraft utilizing the selected at least one secondary information source.

18. The method of claim 17 wherein the automatic landing path can be determined for ILS category I, II, IIIa, and IIIb approaches, RNAV (Area Navigation) Localizer Performance with Vertical Guidance (LPV) approaches, RNAV Vertical Navigation (VNAV) approaches, RNAV lateral navigation (LNAV) approaches, RNAV Required Navigation Performance (RNP) approaches, non-precision approaches, non-published approaches, and/or emergency landing approaches.

19. A system for determining an automatic landing path for an aircraft, the system comprising:

an aircraft landing controller;

a network of sensing systems comprising a Global Navigation Satellite System (GNSS), an Instrument Landing System (ILS), and a vision sensing system;

a processor;

a communication device operably connected to the processor, the network of sensing systems, and the aircraft landing controller; and computer-readable memory operably connected to the processor, the computer-readable memory encoded with instructions that, when executed by the processor, cause the system to:

receive, via the communication device, one or more radio signals from the ILS;

receive, via the communication device, one or more GNSS signals from the GNSS;

receive, via the communication device, one or more vision sensor signals from the vision sensing system;

evaluate, via the processor, the one or more radio signals, the one or more GNSS signals, and the one or more vision sensor signals; to generate an aircraft landing profile, wherein the aircraft landing profile is indicative of a selected method of automatically landing the aircraft; and transmit, via the communication device, the aircraft landing profile to the aircraft landing controller;

wherein the aircraft landing profile comprises a primary source, wherein the primary source is selected from the ILS, the GNSS, and the vision sensor system, wherein the primary source is used as the selected method of automatically landing the aircraft, and wherein the primary source is determined based upon a deviation selection algorithm.

* * * * *